United States Patent

Gottschalk et al.

Patent Number: 5,998,544
Date of Patent: Dec. 7, 1999

[54] PREPARATION OF GRAFT COPOLYMERS

[75] Inventors: Axel Gottschalk, Neudstadt; Ralf Engelhardt, Ludwigshafen; Martin Weber, Maikammer; Konrad Knoll, Ludwigshafen, all of Germany

[73] Assignee: BASF Aktiengesellschaft, Ludwigshafen, Germany

[21] Appl. No.: 08/948,233

[22] Filed: Oct. 9, 1997

[51] Int. Cl.$^6$ ............ C08L 81/02; C08L 53/02; C08L 25/12

[52] U.S. Cl. ............ 525/92 D; 525/71; 525/89; 525/92 E; 525/96; 525/238

[58] Field of Search ............ 525/96, 238, 92 D, 525/92 E

[56] References Cited

U.S. PATENT DOCUMENTS

| | | |
|---|---|---|
| 3,113,986 | 12/1963 | Breslow et al. . |
| 3,251,905 | 5/1966 | Zelinski . |
| 3,390,207 | 6/1968 | Moss et al. . |
| 3,598,887 | 8/1971 | Darcy et al. . |
| 3,786,116 | 1/1974 | Milkovich et al. . |
| 4,219,627 | 8/1980 | Halasa et al. . |
| 4,226,952 | 10/1980 | Halasa et al. . |

FOREIGN PATENT DOCUMENTS

| | | |
|---|---|---|
| 201 787 | 11/1986 | European Pat. Off. . |
| 1808866 | 11/1968 | Germany . |
| 44 25 916 | 1/1996 | Germany . |
| 195 42 643 | 5/1997 | Germany . |

OTHER PUBLICATIONS

Kunststoffhanbunch, Hrsg. Ri. Viewg + G. Daumiller, Bd. V.S. 118–137, 1969.

B. Voll,mert, Grundriss der Makromolekularen chemie. Bd. 1. s. 114–116, 1988.

P. Remp, E. Franta, Advances on Polymer Sci. Bd. 58, S. 1–53, 1984.

M. Morton, Anioic Polymerization, Principales and Practice, Academic Press, N.Y. pp. 221–232.

Lazarewska "Preparation of Graft Copolymers by Reaction of Terminal Carbanions with Nitriles".

*Primary Examiner*—David Buttner
*Attorney, Agent, or Firm*—Keil & Weinkauf

[57] ABSTRACT

Graft copolymers are prepared by anionic polymerization which comprises reacting polymers (A) having at least one anionic chain end with polymers (B) which contain at least one nitrile group, in the presence of a solvent.

8 Claims, No Drawings

PREPARATION OF GRAFT COPOLYMERS

The present invention relates to a process for preparing graft copolymers by anionic polymerization.

Anionic polymerization is a process known per se with which it is possible to prepare polymers of a particular structure and defined molecular weights in a precise manner. However, there are restrictions on the use of this process when monomers or polymers containing functional groups are to be reacted, since the high reactivity of the anions frequently results in undesired side-reactions.

Processes for preparing block copolymers containing blocks whose monomers have functional groups, such as nitrile groups, are disclosed in DE-A-44 25 916, for example, which proposes preparing polystyrene-b-polystyrene-acrylonitrile by beginning with anionic polymerization of styrene, capping the chain end with a thiol, then carrying out a free-radical polymerization of a monomer mixture of styrene and acrylonitrile. Since transfer reactions occur during this reaction procedure, the yield of block copolymers is unsatisfactory.

DE-P-195 42 643.6 describes another process for preparing block copolymers by anionic polymerization. In this method, olefinic monomers undergo anionic polymerization in a first step, the chain end is capped, and then monomers with functional groups, preferably methyl methacrylate or ε-caprolactone, are polymerized.

It is known from M. Morten, Anionic Polymerisation, Principles and Practice, Academic Press, New York 1983, p. 222, for example, that polystyrene can be reacted with polymethyl methacrylate to give graft copolymers, using anionic polymerization. Styrene macromonomers having reactive chain ends were described for the first time in U.S. Pat. No. 3,786,116. P. Remp, E. Franta, Advances in Polymer Science, Vol. 58, p. 1, 1984 reviews the construction of comb polymers via macromonomers.

Graft copolymers whose main chains are built up from monomers containing nitrile groups, from mixtures of styrene and acrylonitrile for example, are prepared by free-radical polymerization, as described in B. Vollmert, Grundriβ der Makromolekularen Chemie, Vol. 1, p. 116, Vollmert Verlag, Karlsruhe, 1988, for example. However, it is difficult to control the reaction and to build up graft copolymers with a defined structure.

It is an object of the present invention to develop a new process for preparing graft copolymers, in which process polymers containing nitrile groups form the graft base.

We have found that this object is achieved by means of a process in which the graft copolymers are prepared by anionic polymerization, where polymers (A) having at least one anionic chain end are reacted with polymers (B) which contain at least one nitrile group, in the presence of a solvent.

For preparing the polymers A, any monomer which can undergo anionic polymerization is suitable.

The polymers A may therefore be built up from olefinically unsaturated monomers, in principle any olefinically unsaturated monomer which contains no functional groups, such as acid groups or hydroxyl groups.

Conjugated dienes are preferably used as monomers. Of these, those having from 4 to 16 carbon atoms are preferred. Particularly preferred conjugated dienes contain from 4 to 8 carbon atoms. Both linear and cyclic conjugated dienes are suitable. These may contain, as substituent, alkyl groups, preferably $C_1$–$C_3$-alkyl, in particular methyl.

Examples which may be mentioned are 1,3-butadiene, 1,3-pentadiene, 2-methylbuta-1,3-diene, 2,3-dimethylbuta-1,3-diene and conjugated hexadienes, preferably 1,3-hexadiene. The use of 1,3-butadiene or 2-methylbuta-1,3-diene as monomer is very particularly preferred. Mixtures of different olefinically unsaturated monomers in any desired mixing ratio may also be used to build up the polymers A.

The mean molecular weight of polymers A built up from olefinically unsaturated monomers may be within a wide range. The mean molecular weight is generally chosen to correspond with the desired properties of the graft copolymers. The mean molecular eight (number-average Mn) of the polymer A is generally in the range from 5000 to 500,000 g/mol, preferably from 10,000 to 100,000 g/mol.

Other preferred polymers A are built up from vinylaromatic monomers of the formula I

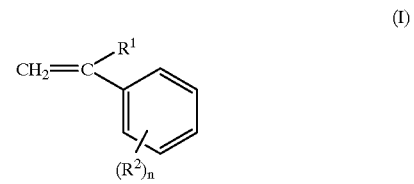

in which $R^1$ and $R^2$, independently of one another, are hydrogen, halogen or $C_1$–$C_8$-alkyl. The variable n is an integer from 1 to 5. Examples which may be mentioned are styrene, p-chlorostyrene, α-methylstyrene, p-methylstyrene, vinyltoluene and p-tert-butylstyrene. The polymers A may also be built up from a mixture of different vinylaromatic monomers, but preference is given to the use of styrene alone. The mean molecular weight (number-average) of polymers A based on vinylaromatic monomers is generally not of significance. It is generally in the range from 5000 to 500,000 g/mol, preferably in the range from 10,000 to 100,000 g/mol.

The polymers A which are preferred also include block copolymers, in particular block copolymers built up from one block of vinylaromatic monomers and one block of conjugated dienes. Monomers of this type have been described above.

The polymers A may be prepared by known methods of anionic polymerization. The block copolymers may, for example, be prepared by sequential addition of the monomers or by coupling techniques.

Processes of this type are described in detail, for example, in U.S. Pat. Nos. 3,251,905, 3,390,207, 3,598,887 and 4,219,627. Suitable initiators for the anionic polymerization are organic compounds of alkali metals, preferably alkyllithium compounds, such as methyllithium, ethyllithium, n- or sec-butyllithium or isopropyllithium. Particular preference is given to the use of n- or sec-butyllithium. Solvents which are suitable and may expediently be used for the polymerization are straight-chain or branched aliphatic hydrocarbons, eg. n-octane or n-hexane, and unsubstituted or substituted cycloaliphatic or aromatic hydrocarbons, such as cyclohexane, methylcyclohexane, toluene, benzene or alkylbenzenes, or any desired mixture of the aliphatic, cycloaliphatic and aromatic hydrocarbons. The use of cyclohexane or ethylbenzene as solvent is advantageous.

Ethers, such as tetrahydrofuran or diethyl ether, and tertiary amines, such as tetramethylethylenediamine or pyridine in concentrations of from 0.01 to 20% by weight, preferably from 0.01 to 2% by weight, are also suitable solvent components. Tetrahydrofuran is preferred.

By means of a suitable choice of the solvent, it is possible, for example, to link conjugated dienes with one another in various ways. For example, if 1,3-butadiene is reacted in a nonpolar solvent to give polymer A or a butadiene block, the proportion of butadiene molecules linked via carbon atoms 1 and 4 is very high (mostly above 80%), giving polymer A or the butadiene block a low glass transition temperature (from −80 to −100° C., for example).

All starting materials must generally be freed from impurities containing oxygen or active protons, for example by contact with organometal compounds or by adsorptive purification, with calcium hydride, for example. The polymerization is generally carried out under inert gas conditions at from −100 to +120° C., preferably at from −80 to +80° C., and at pressures at which the monomers and solvents do not evaporate at the polymerization temperature. On completion of the polymerization, the polymerization mixture is mixed with a sufficient quantity of water, methanol or isopropanol to deactivate the active end groups and/or excess initiator.

The block copolymers are generally prepared by, in a first polymerization step, polymerizing the vinylaromatic hydrocarbon to completion to form the vinylaromatic block and, in the second polymerization step, reacting the diene hydrocarbon to completion to form the second block. This produces sharp transitions between the individual blocks.

It can be advantageous to cap the living anion of the polymer A with compounds, such as diphenylethylene, which contain sterically hindered groups.

According to the invention, the polymers A are reacted with polymers B which contain at least one nitrile group. Preference is given to polymers B which are soluble in a solvent, since the reaction according to the invention is carried out in a solvent.

Particular preference is given to copolymers based on acrylonitrile or methacrylonitrile or mixtures of these, very particular preference being given to those with vinylaromatic comonomers. Suitable copolymers may also contain further comonomers. Examples of preferred polymers B are copolymers built up from $c_1$) from 0.1 to 50% by weight, preferably from 5 to 45% by weight, in particular from 15 to 40% by weight, of acrylonitrile or methacrylonitrile or mixtures of these and $c_2$) from 50 to 99.9% by weight, preferably from 55 to 95% by weight, in particular from 60 to 85% by weight, of a vinylaromatic compound of the formula I, $c_3$) from 0 to 50% by weight, preferably from 0 to 40% by weight, in particular from 0 to 30% by weight, of a further monomer.

Each of the percentages by weight here is based on the total of the components $c_1$ to $C_3$. Examples of vinylaromatic compounds which may be used as component $c_2$ were already given under A. Particular preference is given to the use of styrene or α-methylstyrene as $c_2$. $c_2$ may also consist of a mixture of different vinylaromatic compounds.
Examples of suitable monomers $C_3$ are acrylic acid, methacrylic acid, and also dicarboxylic acids, such as maleic acid and fumaric acid, and their anhydrides, such as maleic anhydride;

nitrogen-functional monomers, such as dimethylaminoethyl acrylate, diethylaminoethyl acrylate, vinylimidazole, vinylpyrrolidone, vinylcaprolactam, vinylcarbazole, vinylaniline and acrylamide;

$C_1$–$C_4$-alkyl methacrylate, such as methyl methacrylate, ethyl methacrylate, n-propyl methacrylate, isopropyl methacrylate, n-butyl methacrylate, isobutyl methacrylate, sec-butyl methacrylate, tert-butyl methacrylate and hydroxyethyl methacrylate;

aromatic and araliphatic esters of acrylic or methacrylic acid, such as phenyl acrylate, phenyl methacrylate, benzyl acrylate, benzyl methacrylate, 2-phenylethyl acrylate, 2-phenylethyl meth-acrylate, 2-phenoxyethyl acrylate and 2-phenoxyethyl meth-acrylate;

unsaturated ether, such as vinyl methyl ether and mixtures of these monomers.

Because their main components are styrene and acrylonitrile, polymers B of this type are generally also termed SAN polymers, and they are known and to some extent also commercially available. They generally have a viscosity number VN (determined according to DIN 53 726 at 25° C., 0.5% by weight in dimethylformamide) of from 40 to 160 ml/g, corresponding to a mean molar mass of from about 40,000 to 200,000 g/mol. They are obtained in a known manner by bulk, solution, suspension, precipitation or emulsion polymerization. Details of these processes are described, for example, in Kunststoffhandbuch, ed. R. Vieweg and G. Daumiller, Vol. V, Polystyrol, Carl-Hanser-Verlag Munich 1969, p. 118 ff.

It has proven especially advantageous to titrate the polymers B with an organometallic compound before the reaction with the polymers A, in order to free the polymers B from impurities containing oxygen or active protons. Organolithium compounds, such as alkyllithium compounds, are preferred for titration. Of these, sec-butyllithium is particularly suitable. The organometallic compounds are dissolved in a nonpolar solvent, preferably a hydrocarbon, in particular hexane, and added dropwise to a solution of the polymer B in a suitable solvent. During this, the solution becomes yellow shortly after drops of the titrant are added. The end point of the titration is reached when this yellow coloration does not immediately disappear again after a drop of the solution was added. If the yellow coloration remains present, the solution has already been titrated to excess. Suitable solvents are polar aprotic solvents in which the polymers B have good solubility. The solvents listed above or mixtures of these may be used, but aromatic hydrocarbons, in particular alkylaromatics, are particularly preferred, and ethylbenzene is very particularly preferred.

The reaction of the polymers A with the polymers B is preferably carried out in the solvent in which polymers B were already dissolved for the titration. It may, of course, also be advantageous to dissolve the polymers A and B in different solvents, or to titrate the polymers B in a solvent and then to change the solvent for the polymer B.

The reaction of the polymers A with the polymers B is generally at from −20 to +60° C. Since the grafting reaction takes place via anionic chain ends, air and moisture should be substantially excluded, so that the living chain ends are not deactivated prematurely.

The ratio of the polymers A to the polymers B can vary over a wide range, so that graft copolymers of any desired formulation are obtained. The polymers A are preferably reacted with the polymers B in a molar ratio of from 1:0.2 to 1:5.

Styrene, α-methylstyrene, p-methylstyrene or vinyltoluene may be used, particular preference being given to styrene.

From 1 to 20, preferably from 1 to 10, equivalents of the vinylaromatic compound II are generally used for each living end of the block A. Each living end of the block A is particularly preferably capped with from 1 to 5 equivalents of the vinylaromatic compound of the formula II.

For the subsequent reaction with compounds of the formula I, from 1 to 10 equivalents, preferably from 1 to 5 equivalents, in particular from 1 to 3 equivalents are generally used for each equivalent living chain end.

After the graft copolymerization is completed, this anionic reaction is generally terminated by mixing the reaction mixture with water or alcohols, such as methanol or isopropanol, in order to deactivate the living end groups and/or excess initiator.

The resultant graft copolymers, which contain conjugated dienes as monomeric building blocks, may be converted by hydrogenation treatment into polymers in which some of the aliphatic unsaturated bonds have been saturated, ie. which have a degree of hydrogenation of from 50 to 100% by weight, preferably from 70 to 100% by weight, and in particular from 90 to 100% by weight.

The hydrogenation is preferably carried out using molecular hydrogen and catalysts based on metals or metal salts of the eighth group of the Periodic Table. It may be carried out in heterogeneous phase, eg. using Raney nickel, or preferably in homogeneous phase using catalysts based on salts, in particular carboxylates, alkoxides or enolates of cobalt, nickel or iron which are combined with alkyl metal compounds, in particular with alkylaluminum compounds, or homogeneously using diimines produced in situ from tosyl hydrazide, for example. Processes for selective hydrogenation of block copolymers are described, for example, in U.S. Pat. Nos. 3,113,986 and 4,226,952.

To isolate the graft copolymer, the reaction mixture may be directly heated to dryness or treated with steam, the solvent being distilled off, according to known processes. It may likewise be precipitated in an excess of a medium, such as ethanol, in which it is not soluble, and mechanically separated and dried or worked up by degassing in an extruder.

The graft copolymers obtainable by the novel process can be converted to shaped articles, films or fibers. This can be carried out, for example, by conventional processes, such as extrusion or injection molding. The graft copolymers are also suitable as compatibilizers in polymer blends, eg. for mixtures of polystyrenes with polycarbonates, of polystyrenes and styrene/acrylonitrile copolymers, of polyphenylene ethers and polycarbonates, of polyphenylene ethers and styrene/acrylonitrile copolymers, or of polyarylene ethers, such as polyarylene ether sulfones or polyarylene ether ketones with polycarbonates.

EXAMPLES

All operations were carried out under nitrogen.
Purification of the monomers and solvents Styrene: predried over calcium hydride, distilled twice, mixed with dibutylmagnesium, stirred, degassed and distilled into a storage vessel.

Ethylbenzene: predried over calcium hydride, distilled, dried over potassium and distilled. The purity of the solvent was checked in each case before the polymerization reaction. For this, the ethylbenzene was added in each case to 0.3 ml of styrene at room temperature, and this mixture was titrated slowly with a 1.5 molar solution of sec-butyllithium in hexane, as far as the appearance of the first yellow coloration, which shows that the styrene anion has been obtained. It was assumed that the solvent was adequately pure when the yellow coloration remained present for 30 minutes.

Cyclohexane: dried over molecular sieve.
Preparation of the graft copolymers
Graft copolymer C1

1200 ml of ethylbenzene (EtB) were tested for purity, then 400 ml (3.5 mol) of styrene were added, and the polymerization was initiated by adding 8 ml (12 mmol) of a 1.5 molar solution of sec-butyllithium in hexane. After one hour at 60° C., the reaction mixture was cooled to room temperature, and a sample was taken to determine the molecular weight (gel permeation chromatography, polystyrene standard). The resultant polymer A1 had a molecular weight (number-average $M_n$) of 32,000 g/mol, and a polydispersity (PDI) of 1.07. In a second reaction vessel, 363 g of a finely powdered and dried styrene-acrylonitrile copolymer (SAN) (acrylonitrile content: 20% by weight, viscosity number 83) were dissolved in 3000 ml of ethylbenzene. This solution was titrated with a 1.5 molar sec-butyllithium solution in hexane. The end point of the titration was indicated when the yellow coloration no longer disappeared immediately after a drop of the sec-butyllithium solution was added. The content of the first reaction vessel was then transferred into the second reaction vessel, with vigorous stirring, within a period of one hour. Stirring was continued for one hour. The graft copolymer C1 was then precipitated, using a mixture of water and methanol, filtered off, and dried under reduced pressure at 60° C.

Graft copolymers C2 to C6

The experiments were carried out as described under C1, except that the solvent and the starting materials were used in the amounts shown in Table 1.

TABLE 1

| Graft co-polymer | EtB [ml] | Styrene [ml]/[mol] | Initiator [ml]/[mmol] | Polymers A2 to A6 | | | EtB [ml] |
|---|---|---|---|---|---|---|---|
| | | | | | Mn [g/mol] | PDI | SAN |
| C2 | 2200 | 720/6.3 | 14.7/21.9 | A2 | 38,700 | 1.07 | 73 | 600 |
| C3 | 1900 | 640/5.6 | 13.0/19.5 | A3 | 34,300 | 1.06 | 145 | 1200 |
| C4 | 1700 | 560/4.9 | 11.5/17.0 | A4 | 29,500 | 1.06 | 218 | 1800 |
| C5 | 1450 | 480/4.2 | 9.9/14.7 | A5 | 29,800 | 1.05 | 290 | 2400 |
| C6 | 950 | 320/2.8 | 6.5/9.7 | A6 | 34,300 | 1.08 | 454 | 3600 |

Graft copolymer C7

1600 ml of ethylbenzene were tested for purity. 300 ml (2.6 mol) of styrene were then added, and the polymerization was initiated by adding 6 ml (18 mmol) of a 1.5 molar sec-butyllithium solution in hexane. The mixture was heated to 40° C., and after a further 2 hours of reaction time a sample was taken for GPC investigation (polystyrene standard). The polymer had a molecular weight (number-average) of 29,800 and a polydispersity of 1.06.

136 ml (1.68 mol) of butadiene were then slowly added. Stirring was then continued for 2 hours, and the mixture was cooled to room temperature. Another GPC sample was taken. The styrene-butadiene block copolymer A7 had a molecular weight (number-average) of 38,900 and a polydispersity of 1.06 (polystyrene calibration standard).

In a second reaction vessel, 363 g of a finely powdered and dried styrene-acrylonitrile-glycidyl methacrylate copolymer (acrylonitrile content: 17.5% by weight, glycidyl methacrylate content: 2.5% by weight, viscosity number 76) were dissolved in 3000 ml of ethylbenzene. This solution was likewise titrated with a 1.5 molar sec-butyllithium solution in hexane until the yellow coloration no longer disappeared immediately after a drop of the solution was added. The content of the first reaction vessel was then transferred into the second reaction vessel, with vigorous stirring, within a period of about 1 hour. After one hour, the graft copolymer was precipitated (methanol/water) filtered off, and dried under reduced pressure at 60° C.

Graft copolymer for comparison C*

The initial charge was 3733 g of cyclohexane and 1600 g of styrene. 16 mmol of butyllithium (1.5 molar in cyclohexane) were added, and the temperature rose after 9 min to a maximum of 74° C. After 50 min, the temperature had fallen to 60° C. After 75 min, the polystyrene anions were terminated, firstly with 17.6 mmol (1.05 ml) of ethylene sulfide and then with 17.6 mmol (1.22 ml) of thioglycolic acid, and 30 min later with 24 mmol (1.85 ml) of isopropanol. The polymer solution was precipitated in ethanol, washed with ethanol and then dried under reduced pressure at 65° C.

400 g of the resultant mercapto-terminated polystyrene were mixed with 320 g of styrene, 80 g of acrylonitrile, 1200 g of toluene and 2.13 g of dibenzoyl peroxide. The reaction mixture was heated to 95° C. 2.4 g of dicumyl peroxide were added when the styrene-acrylonitrile polymerization had reached 32% by weight conversion. The reaction was continued for 3 hours at 110° C., 9 hours at 130° C. and 5 hours at 140° C. The polymer C* was then precipitated in methanol and dried.

Molding compositions were prepared from the graft copolymers by mixing them with other polymers. The other polymers used were:

Polymer D poly(2,6-dimethyl-1,4-phenylene ether) with a reduced viscosity of 0.56 (1% strength by weight solution in chloroform at 30° C., according to DIN 53 728).

Polymer E ABS, consisting of 29 parts of a polybutadiene graft rubber (prepared according to EP 62 901) and 71 parts of a styrene-acrylonitrile copolymer with 20% by weight of acrylonitrile and a viscosity number of 83 ml/g (measured according to DIN 53 727 as 0.5% strength by weight solution in DMF at 23° C.).

Polymer F styrene-butadiene rubber with the block sequence S-B-S'-B' (styrene content=42% by weight) and a Shore A hardness of 87 (Tufprene® A from Asahi)

The polymers were mixed in the amounts shown in Table 2 in a twin-screw extruder (ZKS 30 from Werner & Pfleiderer) at a rotation rate of 200 rpm and 280° C., discharged, cooled, granulated, dried and injection molded to give appropriate standard test specimens.

The notched impact strength was determined according to DIN 53 453, and the modulus of elasticity was determined in a tensile test according to DIN 53 455.

TABLE 2

| | Molding compositions containing graft copolymers | | | | | | | | |
|---|---|---|---|---|---|---|---|---|---|
| Example No. | 1 | 1 C | 2 | 3 | 4 | 5 | 6 | 7 | 2 C |
| Components: [% by weight] | | | | | | | | | |
| C1 | 10 | | | | | | | | |
| C* | | 10 | | | | | | | |
| C2 | | | 10 | | | | | | |
| C3 | | | | 10 | | | | | |
| C4 | | | | | 10 | | | | |
| C5 | | | | | | 10 | | | |
| C6 | | | | | | | 10 | | |
| C7 | | | | | | | | 10 | |
| D | 35 | 35 | 35 | 35 | 35 | 35 | 35 | 35 | 40 |
| E | 50 | 50 | 50 | 50 | 50 | 50 | 50 | 50 | 55 |
| F | 5 | 5 | 5 | 5 | 5 | 5 | 5 | 5 | 5 |
| Properties: | | | | | | | | | |
| Notched Impact strength [kJ/m$^2$] | 7 | 4 | 7 | 8 | 7 | 7 | 6 | 10 | 1 |
| Modulus of elasticity [N/mm$^2$] | 2100 | 2050 | 2140 | 2060 | 2090 | 2060 | 2060 | 1980 | 1900 |

We claim:

1. A process for preparing graft copolymers by anionic polymerization, which process comprises reacting block copolymers (A) made from one block of vinylaromatic monomers and one block of conjugated dienes having at least one anionic chain end with polymers (B) which contain at least one nitrile group, in the presence of a solvent.

2. A process for producing compatibilzed polymer mixtures of polystyrenes with polycarbonates, polystyrenes and styrene/acrylonitrile copolymers, of polyphenylene ethers and polycarbonates, of polyphenylene ethers and styrene/acrylonitrile copolymers, or of polyarylene ethers with polycarbonates by providing mixtures of said polymers containing graft copolymers prepared by the process of claim 1.

3. A process of producing compatibilized polymer mixtures by providing said polymer mixtures with graft copolymers prepared by the process of claim 1.

4. A process as claimed in claim 1, wherein polymer A is polystyrene-b-polybutadiene.

5. A process as claimed in claim 1, wherein polymer B is a copolymer based on styrene and acrylonitrile.

6. A process as claimed in claim 1, wherein the polymers B are titrated with a solution of an organometallic compound before the reaction with the polymers A.

7. A process as claimed in claim 6, wherein sec-butyllithium is used as organometallic compound.

8. A process as claimed in claim 1, wherein the reaction of A with B is carried out in ethylbenzene.

* * * * *

UNITED STATES PATENT AND TRADEMARK OFFICE
CERTIFICATE OF CORRECTION

PATENT NO.: 5,998,544

DATED: December 7, 1999

INVENTOR(S): GOTTSCHALK et al.

It is certified that error appears in the above-identified patent and that said Letters Patent is hereby corrected as shown below:

On the cover page, insert the following foreign application priority data:

--[30]   Foreign Application Priority Data
Oct. 15, 1996   [DE]   Germany   196 42 489. 5 --

Signed and Sealed this

Twenty-second Day of August, 2000

Q. TODD DICKINSON

*Attest:*

*Attesting Officer*   *Director of Patents and Trademarks*